United States Patent Office 2,880,168
Patented Mar. 31, 1959

2,880,168
MAINTENANCE OF CATALYST ACTIVITY USING METHYL CLORIDE

Morris Feller, Park Forest, Ill., assignor to Standard Oil Company, Chicago, Ill., a corporation of Delaware No Drawing. Application December 20, 1956
Serial No. 629,447

9 Claims. (Cl. 208—140)

This invention relates to platinum catalysts, and more particularly to treatment of alumina-supported platinum catalysts to restore the chloride level and activity thereof.

Alumina-supported platinum catalysts are now employed on a large scale in the conversion of hydrocarbons, particularly in the conversion of the low octane naphthas into gasolines of high anti-knock rating by means of the so-called "hydroforming" process. Such catalysts often contain small amounts of halogen, usually not exceeding about 2 weight percent, based on dry $Al_2O_3$, generally in the range of about 0.4 to 1.0 weight percent. Such halogen is sometimes lost from the catalyst during reforming operations, and under certain circumstances it becomes desirable to replace such halogen. Such replaced halogen should be evenly distributed throughout the catalyst bed, but in practice, however, obtaining even distribution of replaced halogen is a major problem whether the halogen is added while on-stream or not. For instance, when carbon tetrachloride is added to a catalyst bed, the first portion of the bed picks up excessive chloride, e.g., above about 2 weight percent, before the last portion of the bed picks up even 0.5 weight percent. Other chloride compounds not only exhibit this same disability of poor distribution but also have the additional disadvantage of being only partially picked up. For example, when chlorobenzene is added to a platinum-alumina catalyst to replace lost halogen, less than 60 percent of the added chlorobenzene is picked up by the catalyst, and the first portion of the catalyst bed exceeds 2 weight percent chloride before the last portion of the bed reaches 0.3 weight percent. Another problem with many organic chloride compounds as a source of chloride is the simultaneous deposition of excessive coke on the catalyst. Thus, for example, in a series of tests with 2-chloroethanol, 3-chloropropanol, 1,3-dichloro-2-propanol, and 3-chloro-1,2-propanol, as much as five to ten times as much coke was added to the catalyst as chloride.

Excessive halogen, such as is caused by poor distribution of replaced halogen, leads to excessive hydrocracking, stripping of platinum from the catalyst, and transformation of the alumina from the active gamma form to the inactive alpha form. Steaming of the catalyst during and/or after halogen addition may give better distribution, but undesirable corrosive conditions also result, particularly where the halogen is added to reaction vessels as a hydrogen halide. It is accordingly an object of my invention to restore the chloride level of platinum alumina catalyst. Another object is to obtain even distribution of chloride on platinum alumina catalyst at chloride levels up to about 2 weight percent. Another object is to restore the chloride level and activity of platinum-alumina catalyst without causing corrosive conditions, excessive hydrocracking, excessive coke deposition, stripping of platinum, and/or conversion of alumina from gamma to alpha form. These and other objects of my invention will be apparent from the following description thereof.

I have discovered a simplified method for adding chloride to platinum-alumina catalyst, by which the chloride content of the catalyst can be adjusted to a preselected level up to about 2.0 weight percent without addition of excessive coke, and the chloride at the preselected level is evenly distributed throughout the treated catalyst. I have found that methyl chloride has the unique property among halogen compounds of reaching an equilibrium level with platinum-alumina catalyst at levels up to about 2 weight percent chloride on the catalyst, the particular level being a function of the contacting temperature. In general, the equilibrium level of chloride increases on the average about 0.035 to 0.045 weight percent per 10° F. temperature rise up to about 250° F., at which temperature the chloride equilibrium is about 1 weight percent. Above about 250° F., the equilibrium chloride level increases on the average about 0.01 to 0.025 weight percent per 10° F. temperature rise up to about 800° F., at which temperature the chloride equilibrium is about 2 weight percent. In practicing my invention I therefore expose deactivated platinum-alumina catalyst to contact with excess methyl chloride at a temperature below about 800° F. for a period in excess of about 0.1 second, whereby the chloride level of the catalyst is adjusted to a preselected value in the range up to about 2 weight percent, based on dry $Al_2O_3$. In one embodiment I contact chloride-depleted platinum-alumina catalyst with excess methyl chloride for a period in excess of about 0.1 second at a temperature in the range of about 100 to 250° F., whereby the chloride level of the catalyst is raised to a level of about 0.4 to 1 weight percent, and preferably at a temperature in the range of about 200 to 250° F., whereby chloride level of the catalyst is adjusted to a level of about 0.8 to 1 weight percent.

Treating temperature is limited to a maximum of about 800° F., the decomposition temperature of methyl chloride. The treatment may be liquid phase or vapor phase, preferably vapor phase. For vapor phase treatment, treating pressure must be reduced below the vapor pressure of methyl chloride. Vapor pressure data for methyl chloride at any given temperature are available in many readily-available standard handbooks, e.g., "Chemical Engineers' Handbook," third edition, 1950, J. H. Perry, McGraw-Hill, page 271; "Encyclopedia of Chemical Technology," volume 3, 1949, R. E. Kirk and D. F. Othmer, Interscience Publishers, Inc., page 738. Time of exposure or contact with methyl chloride should be in excess of about 0.1 second, preferably in the range of about 1 second to 10 minutes. Since the equilibrium level is reached very rapidly, which is another advantage of methyl chloride, treating times in excess of 10 minutes are usually unnecessary, although they may, of course, be used.

Methyl chloride itself, or, preferably, a carrier gas, e.g., nitrogen, flue gas, etc., containing methyl chloride in a concentration in excess of about 0.005 percent by volume, preferably 1 to 10 percent, may be used in the practice of my invention. If flue gs is used as a carrier, it should contain at least about 0.1 percent or preferably about 1 percent by volume of oxygen at all times to avoid poisoning the catalyst with carbon monoxide and to eliminate possible formation of a volatile platinum complex with chlorine and carbon monoxide. The gas velocity may preferably be in a range of about 0.01 to 10 linear feet per second.

The term "excess methyl chloride," as used herein, means methyl chloride in a quantity equal to or in excess of the amount required to raise the chloride level of the platinum-alumina catalyst to the preselected value. Since, advantageously, substantially all of the added methyl chloride is picked up by the catalyst until the equilibrium chloride level is reached, "excess methyl chloride" equals or exceeds the amount equivalent to the equilibrium chloride level at the selected contacting temperature less the chloride already present in the catalyst prior to treatment. Thus, for instance, a catalyst which already contains X weight percent chloride, based on dry $Al_2O_3$, when contacted at a temperature of about 100 to 250° F., need only be contacted with methyl chloride equivalent to about 0.4—X to 1.0—X weight percent chloride, whereas a platinum-alumina catalyst with no chloride present must be contacted at the same contacting temperatures with methyl chloride equivalent to at least about 0.4 to 1 weight percent chloride. Limiting the amount of "excess methyl chloride" to that required to reach equilibrium effectively prevents circulation of methyl chloride throughout the conversion system. This may be advantageous under certain circumstances, particularly in wet system wherein corrosive conditions may prevail. In general, however, essentially dry conditions are preferred for practice of my invention.

My new treating technique is effective broadly for the restoration of the catalyst properties of alumina-supported platinum catalysts after deactivation thereof in a hydrocarbon conversion process such as the hydroforming of low-octane naphthas. Such catalysts may be prepared by any of a number of ways known to prior art, such as, for instance, contacting an aqueous solution of chloroplatinic acid with an ammonium sulfide sulfurizing agent for converting the platinum into a sulfurized form of platinum sulfide in a stable aqueous solution; then combining this true or colloidal solution with hydrous alumina prepared as taught in U.S. Re. 22,196, the resulting mixture then being dried and calcined. Such a catalyst may contain 0.05 to 1 weight percent of platinum and an equivalent amount of chloride, preferably 0.4 to 1 weight percent chloride. During reforming operation with such a catalyst the chloride content may be reduced to values substantially below the original chloride content. My technique is particularly advantageous in restoring the chloride level of such a catalyst after a hydroforming cycle.

In a typical hydroforming cycle, a mixture of petroleum naphtha and hydrogen-containing gas is passed through a bed of platinum-alumina catalyst containing between about 0.05 and 1 percent by weight of platinum, based on dry $Al_2O_3$, where the hydroforming reactions are carried out at a temperature in the range of about 850 to 1050° F., a total pressure between about 100 and 1200 pounds per square inch, a hydrogen partial pressure between about 50 and 1000 pounds per square inch, a hydrogen rate in the range of about 1,000 to 10,000 standard cubic feet per barrel of charging stock, and an hourly weight space velocity between about 0.5 and 10. At any chosen set of conditions within these ranges, catalyst life before catalyst replacement or reactivation becomes necessary is found to vary in an inverse direction to the severity of treatment. Under mild conditions, the catalyst may function for months without serious decline in properties; while under more severe conditions, especially at lower hydrogen partial pressures, such as used in Ultraforming (Petroleum Engineer, vol. XXVI, No. 4, April 1954, at page C–35), catalyst life per cycle may be as little as a few days. In general, it is desirable to avoid continuing the operation beyond the point where the yield of the desired product decreases more than two percent by volume at a given octane level, or beyond the point where the product octane drops more than two CFR–R units at a given product yield.

After the hydroforming operation has been discontinued and the catalyst has been removed from on-stream conditions, residual charging stock and hydrogen are purged from the catalyst zone with an inert gas in order to avoid any possibility of forming explosive mixtures. Thereafter, the catalyst bed is cooled, preferably by circulating low-temperature inert gas, and is then contacted with excess methyl chloride for a period in excess of about 0.1 second at a temperature below about 800° F., preferably between about 100 and 250° F., optimally between about 200 and 250° F.

Before the methyl chloride treatment, I prefer to carry out a burnoff operation under mild conditions to remove coke and other organic residues from the catalyst particles. The carbon burnoff is suitably carried out with dilute oxygen (above about 0.5 percent oxygen, preferably around 1 to 2 percent oxygen) at a temperature above about 800° F. and below about 1300° F. for a period in excess of about 0.25 hour. The carbon content of the catalyst is ordinarily reduced below about 0.05 percent by weight in a contact time of around 1 to 24 hours.

After the methyl chloride treatment, I prefer to effectuate the chloride by contacting the catalyst with oxygen in the form of free oxygen or to a gas stream, usually nitrogen or flue gas, containing oxygen in a concentration of at least about 0.5 percent by volume, preferably at least about 1 or 2 percent by volume, and optimally at a high partial pressure, e.g., above 0.4 atmosphere, and at a temperature above about 800 and below about 1300° F., preferably between about 950 and 1300° F., for a period of at least about 0.1 hour, preferably 0.25 hour or more, optimally 1 to 24 hours, whereby catalyst activity is greatly improved. It is believed that effectuation by contact with oxygen as above described brings about some sort of physical or chemical bondage of the platinum, chloride, and oxygen, whereby the resulting catalyst has an activity greater than that of fresh catalyst with the same chloride content.

My new technique may be advantageously used as a continuing feature of a low-pressure, cyclic-regenerative hydroforming process. In such a process, the chloride content of the catalyst is advantageously in the range of about 0.4 to 1 weight percent, chloride contents in excess of about 1.0 percent being deleterious because of yield loss. From time to time the platinum-alumina catalyst is withdrawn from hydroforming conditions to burn carbon and other organic residues from the catalyst. Carbonaceous deposits are burned off by controlled addition of oxygen, as described above. The carbon burnoff is optionally followed by an oxidative rejuvenation treatment to effect additional advantageous physical-chemical changes of indeterminate nature in the catalyst structure. An oxidative rejuvenation treatment is carried out by subjecting a catalyst to contact with oxygen at a temperature between about 950 and 1300° F., an oxygen partial pressure above about 0.4 atmosphere, and a contact time of around 0.25 hour or more, preferably at a temperature between about 1000 and 1100° F., an oxygen partial pressure between about 1 and 10 atmospheres, and a contact time of about 1 to 10 hours. Such a rejuvenation treatment should be carried out only upon catalysts having a carbon level below about 0.1 percent by weight in order to avoid localized overheating of the catalyst at the partial pressure of oxygen employed. Accordingly, the catalyst can be withdrawn from the hydroforming cycle before the carbon level has exceeded such amount, or alternatively it should be given a carbon burnoff treatment under the conditions set forth above in order to reduce the carbon level below about such amount. The methyl chloride treatment of the present invention may be used in place of, or, preferably, in addition to the carbon burnoff and/or oxidative rejuvenation.

My invention may be satisfactorily carried out in such a cyclic-regenerative process by introducing methyl chloride into the catalyst zone at the prescribed temperature before or after regeneration or before or after regeneration-rejuvenation. Alternatively, the methyl chloride may be introduced in accordance with my invention between the regeneration and rejuvenation steps. Regeneration or rejuvenation after treatment with methyl chloride serves the additional function of effectuating the chloride by contact with oxygen. When neither a regeneration nor a rejuvenation follow treatment of the catalyst with methyl chloride, the chloride treatment may be effectuated by oxygen contact in the subsequent reactivation cycle.

In a preferred embodiment of my invention a platinum-alumina catalyst, after becoming deactivated in a hydroforming operation, is removed from hydroforming conditions and is subjected to a mild oxidation with 2 percent oxygen in nitrogen at 900 to 1100° F. to remove carbon and organic materials therefrom, then cooled to a temperature in the range of about 200 to 250° F., then contacted at said temperature range with nitrogen containing about 5 volume percent methyl chloride for a period of about 1 minute, then optionally soaked at 950 to 1300° F. for about 0.1 to 10 hours in an atmosphere containing oxygen at a partial pressure of 0.4 atmosphere or higher, and finally returned to hydroforming operation until again deactivated, following which the above procedure is repeated.

My invention will be more fully understood from the following specific examples.

*Example I*

A series of tests illustrating my invention were made on a platinum-alumina catalyst, which contained about 0.6 weight percent platinum and about 0.6 weight percent chloride when fresh. This catalyst had been produced in 1/8" x 1/8" pellets from a Heard-type alumina hydrosol in the manner described hereinabove. Prior to these tests the catalyst was used extensively for upgrading a Gulf Coast naphtha, including a series of on-stream, regeneration, and rejuvenation cycles, at the end of which the chloride content was reduced to about 0.08 weight percent. Carbon was burned from the catalyst, and a number of aliquot samples of the catalyst were prepared. Some of these samples were then activated in accordance with my invention.

The catalyst was placed in a pilot-plant reactor in three separate beds of 20 grams each (inlet, middle, and outlet beds) and contacted at various temperatures and at atmospheric pressure with a treating gas comprising nitrogen, about 1 mol percent oxygen, and about 5 mol percent methyl chloride. Contact time was ten seconds. In each test treating gas was added in an amount equivalent to about 3.5 weight percent chloride, based on the catalyst. Chloride content of each bed was then determined, and the results, which illustrate the excellent distribution of chloride and the increase in equilibrium level of chloride with increase in temperature, are as follows:

| Treating Temp., ° F. | No. of Tests | No. of Cl− Determinations | Avg. Cl− Content of Beds, Weight Percent | Max. Deviation of any bed from Avg. Cl−, Weigh Percent |
|---|---|---|---|---|
| 80 | 1 | 3 | 0.3 | ±0.0 |
| 265 | 1 | 3 | 1.2 | ±0.1 |
| 500 | 1 | 3 | 1.4 | ±0.1 |
| 800 | 2 | 6 | 2.0 | ±0.3 |

*Example II*

A series of runs with other samples of the same catalyst described in Example I was made using carbon tetrachloride, chloroform, chlorobenzene, trichloroethylene, and n-amyl chloride at contact times varying from 1–100 seconds, temperatures from 80–1000° F., and treat levels from 0.2 to 2.5 percent chloride. In none of these runs was uniform distribution of chloride throughout the inlet, middle and outlet beds obtained. Typical of the results obtained are the data for chlorobenzene at a treat level of 2 weight percent chloride, based on catalyst, with 1.9 weight percent chloride in the carrier gas (nitrogen with about 1 mol percent oxygen, except as otherwise indicated), a contact time of 10 seconds, and atmospheric pressure. These results are as follows:

| Treating Temperature, ° F. | Weight Percent Chloride |||
|---|---|---|---|
| | Inlet Bed | Middle Bed | Outlet Bed |
| 350 | 0.47 | 0.23 | 0.22 |
| 425 | 0.59 | 0.24 | 0.14 |
| 500 | 1.91 | 1.20 | 0.22 |
| 800 | 2.17 | 1.19 | 0.20 |
| 900 | 1.40 | 0.28 | 0.18 |
| 900 [1] | 0.66 | 0.23 | 0.16 |

[1] High purity $N_2$ used ($O_2 \leq 100$ p.p.m.).

*Example III*

With other samples of the same catalyst described in Example I a series of tests was made which illustrate the excellent chloride pick-up obtained when less than equilibrium amounts of methyl chloride are passed over the catalyst. In these tests treat level, temperature, percent chloride in the carrier gas, and contact time were varied. In addition, benzene was also added to the carrier gas in two tests to attempt to block adsorption of methyl chloride on the catalyst. For comparison with methyl chloride, additional tests were carried out using n-amyl chloride and chlorobenzene. The results, which illustrate the marked superiority of methyl chloride with respect to chloride pick-up, are presented in the following table:

| | Methyl Chloride | | | | n-Amyl Chloride | Chlorobenzene [1] |
|---|---|---|---|---|---|---|
| Wt. Percent Chloride in Carrier Gas | 13 | 8.0 | 1.2 | 8.5 | 4 | 1.9 |
| Treat Level, Wt. Percent | 0.32 | 0.47 | 0.47 | 0.40 | 0.3 | 2.0 |
| Benzene/$CH_3Cl$ | | | 0.86 | 4.1 | | |
| Temp., ° F | 800 | 700 | 700 | 700 | 700 | [1] 350–900 |
| Contact Time, Secs. | 10 | 10 | 1.2 | 10 | 10 | 10 |
| Chloride Pickup, Percent | 100 | 100 | 100 | 100 | 77 | [1] 11–57 |

[1] Six runs were made in this temperature range; maximum chloride pickup of 57 percent occurred at 500° F.

*Example IV*

To illustrate the activating effect obtained with methyl chloride a pilot-plant hydroforming run was made with another sample of the same catalyst. As described in Example I, this catalyst had previously become deactivated after a series of on-stream, regeneration, and rejuvenation cycles. The catalyst was thus essentially carbon-free before contact with methyl chloride in accordance with a preferred embodiment of my invention. The catalyst was then treated with methyl chloride to raise chloride content to 0.55 weight percent. For comparison another sample of the same carbon-free catalyst was treated with chloroethanol to raise chloride content to the same average level of 0.55 weight percent. Operating conditions for both reforming runs were 900° F., 200 pounds per square inch, space velocity of 2, and a hydrogen recycle rate of about 4000 standard cubic feet per barrel of charge, said charge naphtha having the following inspections:

| | Mid-continent virgin |
|---|---|
| Gravity, ° API | 55.8 |
| ASTM distillation, ° F.: | |
| Initial | 210 |
| 10% | 231 |
| 30% | 256 |
| 50% | 275 |
| 70% | 299 |
| 90% | 332 |
| Max. | 389 |
| RVP, lbs. | 1.3 |
| CFR–R octane, clear | 43.5 |
| Sulfur, wt. percent | 0.023 |
| CFR–R octane, clear | 43.5 |

| Analysis, vol. percent: | Mid-continent virgin |
|---|---|
| Paraffins | 48.5 |
| Olefins | Trace |
| Naphthenes | 44.0 |
| Aromatics | 7.5 |

Naphtha products from the reforming operation were collected and octane numbers determined. From these octane data and test conditions, activities of the catalysts were determined. Catalyst activity is a calculated value which measures the relative quantities, expressed as a percentage, of an arbitrarily-chosen catalyst required to produce a $C_5+$ product fraction having the same octane number under the same test conditions. The results obtained in the two tests are as follows:

| Hours on Oil | Relative Active | |
|---|---|---|
| | Catalyst Activated with Methyl Chloride | Catalyst Activated with Chloroethanol |
| 0–20 | 82 | 78 |
| 20–40 | 75 | 54 |
| 40–60 | 69 | 41 |
| 60–80 | 61 | |
| 80–100 | 57 | |
| 100–120 | 61 | |

In this example the catalyst had been subjected to a preferred coke-removal step prior to treatment with methyl chloride and return to hydroforming operation. Alternatively, the catalyst could also have been subjected to an oxidative treatment or oxidative rejuvenation treatment, as hereinabove described, before or, preferably, after the treatment with methyl chloride to effectuate the chloride and to bring about additional advantageous, but indeterminate, changes in the catalyst structure.

While I have described my invention with reference to certain specific embodiments and operating examples, it is to be understood that such embodiments and examples are illustrative only and not by way of limitation. Numerous additional embodiments of the invention and alternative manipulative techniques, process materials, and operating conditions will be apparent from the foregoing description to those skilled in the art.

In accordance with the foregoing description, I claim as my invention:

1. A method of raising the chloride level of platinum-alumina catalyst to a preselected value in the range of about 0.3 to 2.0 weight percent, based on dry $Al_2O_3$, which comprises exposing said catalyst to contact with excess methyl chloride at a temperature in the range of about 80 to 800° F. for a period in excess of about 0.1 second.

2. A method of adjusting the chloride level of platinum-alumina catalyst to a preselected value in the range of about 0.4 to 1.0 weight percent, based on dry $Al_2O_3$, which comprises exposing said catalyst to contact with excess methyl chloride at a temperature in the range of about 100 to 250° F. for a period in excess of about 0.1 second.

3. A method of activating an alumina-supported platinum catalyst containing about 0.05 to 1.0 weight percent platinum based on dry $Al_2O_3$, after deactivation thereof by exposure to a hydrocarbon charging stock under conversion conditions, which comprises contacting said catalyst with a gas containing excess methyl chloride at a temperature in the range of about 200 to 250° F. for a period in excess of about 0.1 second, whereby the chloride level of said catalyst is increased to a level in the range of about 0.8 to 1.0 weight percent, based on dry $Al_2O_3$.

4. A method of activating a catalyst comprising alumina and platinum, said platinum being present in a concentration between about 0.05 and 1.0 weight percent, based on dry $Al_2O_3$, which comprises contacting said catalyst at a temperature of about 100 to 250° F. for a period in excess of about 0.1 second with methyl chloride equivalent to about 0.4 to 1.0 weight percent chloride, based on dry $Al_2O_3$.

5. The method of activating a platinum-alumina catalyst, said catalyst containing about 0.05 to 1.0 weight percent platinum and X weight percent chloride, based on dry $Al_2O_3$, X being in the range of about 0.0 to 0.4, which comprises contacting said catalyst at a temperature of about 100 to 250° F. for a period of about 1 second to 10 minutes with methyl chloride equivalent to about $0.4-X$ to $1.0-X$ weight percent chloride, based on dry $Al_2O_3$.

6. A method of activating a platinum-alumina catalyst after deactivation thereof by exposure to a petroleum naphtha under hydroforming conditions, which comprises exposing said catalyst to contact with excess methyl chloride at a temperature in the range of about 80 to 800° F. for a period in excess of about 0.1 second, thereafter contacting said catalyst with oxygen at a temperature above about 800° F. and below about 1300° F. for a period of at least about 0.1 hour.

7. A method for activating an alumina-supported platinum catalyst after deactivation thereof by exposure to a hydrocarbon charge stock under conversion conditions, which comprises contacting said catalyst with dilute oxygen at a temperature above about 800° F. and below about 1300° F. for a time sufficient to reduce the carbon content thereof below about 0.1 percent by weight, cooling said catalyst to a temperature in the range of about 100 to 250° F. and thereafter contacting said catalyst at said temperature in the range of about 100 to 250° F. with excess methyl chloride in gaseous form for a period in excess of about 0.1 second.

8. A cyclic-regenerative process for hydroforming a petroleum naphtha which comprises the steps of passing a mixture of said naphtha and hydrogen-containing gas at a temperature of between about 850 and 1050° F., a hydrogen partial pressure of between about 50 and 1000 pounds per square inch, a hydrogen rate in the range of about 1000 to 10,000 standard cubic feet per barrel of said petroleum naphtha, and an hourly weight space velocity in the range of about 0.5 to 10, through a bed of platinum-alumina catalyst containing between about 0.05 to 1 percent by weight of platinum and about 0.4 to 1 weight percent chloride, which bed of catalyst under such on-stream conditions tends to become gradually deactivated, removing said bed of catalyst from on-stream conditions after deactivation thereof, contacting said bed of catalyst with dilute oxygen at a temperature above about 800° F. and below about 1300° F. for a period in excess of about 0.25 hour, cooling said bed of catalyst to a contacting temperature in the range of about 100 to 250° F., contacting said catalyst at said contacting temperature with a gas containing excess methyl chloride at a pressure below the vapor pressure of methyl chloride at said contacting temperature for a period in excess of about 0.1 second, returning said bed of catalyst to said on-stream conditions, and periodically repeating the above steps.

9. A low-pressure, regenerative process for hydroforming a petroleum naphtha which comprises the steps of contacting vapors of said naphtha in the presence of hydrogen at a hydrogen partial pressure below about 500 pounds per square inch, a hydrogen rate in the range of about 1000 to 10,000 standard cubic feet per barrel of said naphtha, a temperature in the range of about 850 to 1050° F. and an hourly weight space velocity in the range of about 0.5 to 10 with an alumina-supported catalyst containing between about 0.05 and 1 percent by weight of platinum deposited thereon, which catalyst under such naphtha hydroforming conditions tends to become spent during prolonged periods on stream, periodically withdrawing said catalyst from said naphtha hydroforming conditions, subjecting said bed of catalyst to contact with dilute oxygen at a temperature above about 800° F. and below about 1300° F. for a period sufficient to reduce the carbon content below about 0.1 weight percent, cooling said bed of catalyst to a treating temperature in the range of about 100 to 250° F., exposing said bed of catalyst to contact with excess methyl chloride in the vapor phase at said treating temperature for a period in excess of 0.1 second, subjecting said bed of catalyst to contact at a temperature between about 950 and 1300° F. for about 0.1 to 10 hours with a gas containing oxygen at an oxygen partial pressure above about 0.4 atmosphere, again subjecting said bed of catalyst to said naphtha hydroforming conditions, and periodically repeating the above steps whereby the chloride level of said bed of catalyst at the beginning of each naphtha hydroforming cycle is maintained at a level of between about 0.4 and 1.0 weight percent, based on dry $Al_2O_3$.

References Cited in the file of this patent

UNITED STATES PATENTS

| | | |
|---|---|---|
| 2,479,885 | West | Aug. 23, 1949 |
| 2,606,878 | Haensel | Aug. 12, 1952 |
| 2,641,582 | Haensel | June 9, 1953 |
| 2,642,384 | Cox | June 16, 1953 |

UNITED STATES PATENT OFFICE
CERTIFICATE OF CORRECTION

Patent No. 2,880,168                                   March 31, 1959

Morris Feller

It is hereby certified that error appears in the above numbered patent requiring correction and that the said Letters Patent should read as corrected below.

In the grant, line 3, and in the heading to the printed specification, line 5, State of incorporation, for "Delaware" read -- Indiana --; in the heading to the printed specification, line 3, for CLORIDE" read -- CHLORIDE --; column 1, line 50, for "3-chloro-1,2-propanol" read -- 3-chloro-1,2-propanediol --; column 5, line 56, in the table, heading to column 5, for Weigh" read -- Weight --; column 6, line 75, strike out "CFR-R octane, clear - - - - 43.5".

Signed and sealed this 1st day of September 1959.

(SEAL)
Attest:
KARL H. AXLINE
Attesting Officer

ROBERT C. WATSON
Commissioner of Patents